(12) United States Patent
Nam et al.

(10) Patent No.: US 8,785,018 B2
(45) Date of Patent: Jul. 22, 2014

(54) BATTERY PACK CASE

(75) Inventors: Gueng Hyun Nam, Gwangju (KR); Tae Sin Kim, Gwangju (KR); Duck Jun Lee, Gwangju (KR); Jin Woo Roh, Gwangju (KR); Min Ho Jang, Gwangju (KR)

(73) Assignee: Global Battery Co., Ltd., Seoul (KR)

( * ) Notice: Subject to any disclaimer, the term of this patent is extended or adjusted under 35 U.S.C. 154(b) by 55 days.

(21) Appl. No.: 13/526,630

(22) Filed: Jun. 19, 2012

(65) Prior Publication Data

US 2013/0224541 A1  Aug. 29, 2013

(30) Foreign Application Priority Data

Feb. 27, 2012 (KR) .................. 10-2012-0019465

(51) Int. Cl.
*H01M 2/10* (2006.01)
*H01M 10/48* (2006.01)

(52) U.S. Cl.
USPC ................. 429/90; 429/99; 429/96; 429/97

(58) Field of Classification Search
None
See application file for complete search history.

(56) References Cited

U.S. PATENT DOCUMENTS

| | | | |
|---|---|---|---|
| 6,309,776 B1* | 10/2001 | Okajima et al. | 429/151 |
| 2007/0072066 A1* | 3/2007 | Yoon et al. | 429/99 |
| 2008/0280194 A1* | 11/2008 | Okada | 429/99 |
| 2009/0321303 A1* | 12/2009 | Kang et al. | 206/703 |
| 2010/0159317 A1* | 6/2010 | Taghikhani et al. | 429/120 |
| 2011/0074362 A1* | 3/2011 | Midorikawa | 320/150 |

* cited by examiner

*Primary Examiner* — Patrick Ryan
*Assistant Examiner* — Christopher Domone
(74) *Attorney, Agent, or Firm* — The PL Law Group, PLLC

(57) ABSTRACT

Disclosed herein is a battery pack case. An upper cover, a lower support base and each side cover form at least one seating depression extending in a sideways direction. Each of the front and rear covers has band locking depressions at positions corresponding to the seating depressions. Each band locking depression has a shape corresponding to a related one of fixing bands. Each fixing band includes a band body which is made of rubber, fabric or plastic and extends a predetermined length in one direction, and a locking protrusion provided on each of opposite ends of the band body. The locking protrusion has a structure corresponding to a related one of the band locking depressions. The locking protrusions of the fixing bands are inserted into the corresponding band locking depressions, thus fastening the elements including the front cover and the rear cover together.

16 Claims, 8 Drawing Sheets

BATTERY PACK CASE

CROSS-REFERENCE TO RELATED APPLICATION AND CLAIM OF PRIORITY

This application claims priority to Korean Patent Application No. 10-2012-0019465, filed on Feb. 27, 2012, which is incorporated herein by reference in its entirety.

BACKGROUND

1. Field of the Invention

The present invention relates generally to battery pack cases.

2. Description of the Related Art

Pouch type secondary batteries in which an electrode assembly is installed in a pouch type battery case made of an aluminum laminate sheet are recently gaining popularity because of such advantages as low production cost, lightness of weight, ease of variation in shape, etc., and the use thereof is gradually increasing.

The number of pouch type secondary batteries that form a battery module depends on the required magnitude of output power. The battery module including a stack of pouch type secondary batteries is installed in a battery pack case using a sealed container to meet the requirements of users, and types of large battery packs have been released on the market.

The conventional battery pack case includes an assembly body which includes a front surface, a rear surface, opposite side surfaces, an upper cover and a bottom surface, thus forming a sealed internal space in which the battery module having the stacked battery cells is placed upright. However, the elements of the battery pack case are coupled to each other by nuts and bolts or the like. This causes the problems of increasing the number of assembly processes and working time.

SUMMARY

Accordingly, the present invention has been made keeping in mind the above problems occurring in the prior art, and an object of the present invention is to provide a battery pack case which contains a battery module including battery cells that are electrically connected to each other, and which can reduce the number of assembly processes and working time.

In order to accomplish the above object, in a first embodiment, the present invention provides a battery pack case, including: a lower support base forming a bottom of an internal space, the internal space containing a battery module including battery cells that are electrically connected to each other; side covers coupled to respective opposite side edges of the lower support base, each of the side covers including a plate placed upright; an upper cover coupled to upper ends of the side covers, thus forming an upper surface of the battery pack case; a front cover and a rear cover respectively coupled to front and rear ends of the upper cover and the side covers; and fixing bands fastened to opposite sidewalls of the battery pack case, the fixing bands extending from the front cover to the rear cover. The upper cover, the lower support base and each of the side covers have at least one seating depression extending in a sideways direction. Each of the front and rear covers has band locking depressions at positions corresponding to the seating depressions, each of the band locking depressions having a shape corresponding to a related one of ends of the fixing bands. Each of the fixing bands includes a band body made of rubber, fabric or plastic, the band body extending a predetermined length in one direction, and a locking protrusion provided on each of opposite ends of the band body, the locking protrusion having a structure corresponding to a related one of the band locking depressions, so that the locking protrusions of the fixing bands are inserted into the corresponding band locking depressions, thus fastening the front cover, the upper cover, the side covers, the lower support base and the rear cover to each other.

In a second embodiment, the upper cover includes: a first upper insert part stepped from side surfaces extending downwards from opposite side edges of the top surface, the first upper insert part extending downwards towards the upper ends of the side covers; and a second upper insert part extending from a top surface of the upper cover forwards the front cover and the rear cover, the second upper insert part being inserted into the front cover and the rear cover.

In a third embodiment, each of the side covers includes: a side cover body; a first side insert end stepped and protruded from each of upper and lower ends of the side cover body; and mounting bars provided on the side cover body and extending in a vertical direction, the mounting bars respectively protruding from the side cover body towards the front cover and the rear cover.

In a fourth embodiment, the lower support base includes: a bottom plate; hinge shafts provided on front and rear ends of the bottom plate, each of the hinge shafts being fastened at opposite ends thereof to shaft support plates that are placed upright on the bottom plate at positions spaced apart from each other; bottom side plates protruding upwards from opposite side edges of the bottom plate, the bottom side plates being coupled to the corresponding side covers; and coupling plates protruding upwards from the bottom plate to have different heights relative to upper ends of the bottom side plates, the coupling plates making close contact with inner surfaces of the corresponding side covers.

In a fifth embodiment, the lower support base further include at least one support panel extending from the bottom plate, with a fastening hole formed through the support panel, the support panel being in close contact with a support surface.

In a sixth embodiment, each of the front and rear covers includes a coupling extension which extends downwards therefrom and has a semicircular cross-section, wherein a shaft locking depression is formed in a surface of the coupling extension that extends in a horizontal direction, and the corresponding hinge shaft is seated into the shaft locking depression.

In a seventh embodiment, the front cover includes: a display indicating an internal temperature and an input/output voltage level; and a heat dissipation window having an opening and a plurality of horizontal support bars provided in the opening, each of the support bars being inclined at a predetermined angle, so that heat generated in the battery pack case is dissipated to an outside through the heat dissipation window.

In an eight embodiment, the side covers further include: a power connector through which external power is input/output; and a USB terminal for communication with an external battery or an external system.

In a ninth embodiment, the upper cover further include: an electrode pole hole through which an electrode pole protrudes from the top surface of the upper cover, so that power is input into or output from the battery module including the battery cells that are electrically connected to each other; and a transparent window formed in the top surface of the upper cover to allow a user to observe an interior of the battery pack case.

In a tenth embodiment, the seating depression is formed between a stepped portion of each of the side covers and a stepped portion of the upper cover.

In an eleventh embodiment, the seating depression is formed between a stepped portion of each of the side covers and a stepped portion of a corresponding one of the bottom side plates that protrude upwards from the lower support base.

In a twelfth embodiment, the lower support base further includes support plates provided upright on the bottom plate at positions spaced apart from each other. The support plates support opposite sides of the battery cells placed on the bottom plate.

In a thirteenth embodiment, each of the locking protrusions provided on the opposite ends of the band body has an 'L' shape.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, an embodiment of a battery pack case according to the present invention will be described in detail with reference to the attached drawings.

According to an embodiment of the present invention, a battery pack case contains lithium battery cells configured in a pouch shape to form a battery module, and has a symmetrical insert assembly structure, thus making the assembly or disassembly easy.

Figure 1:
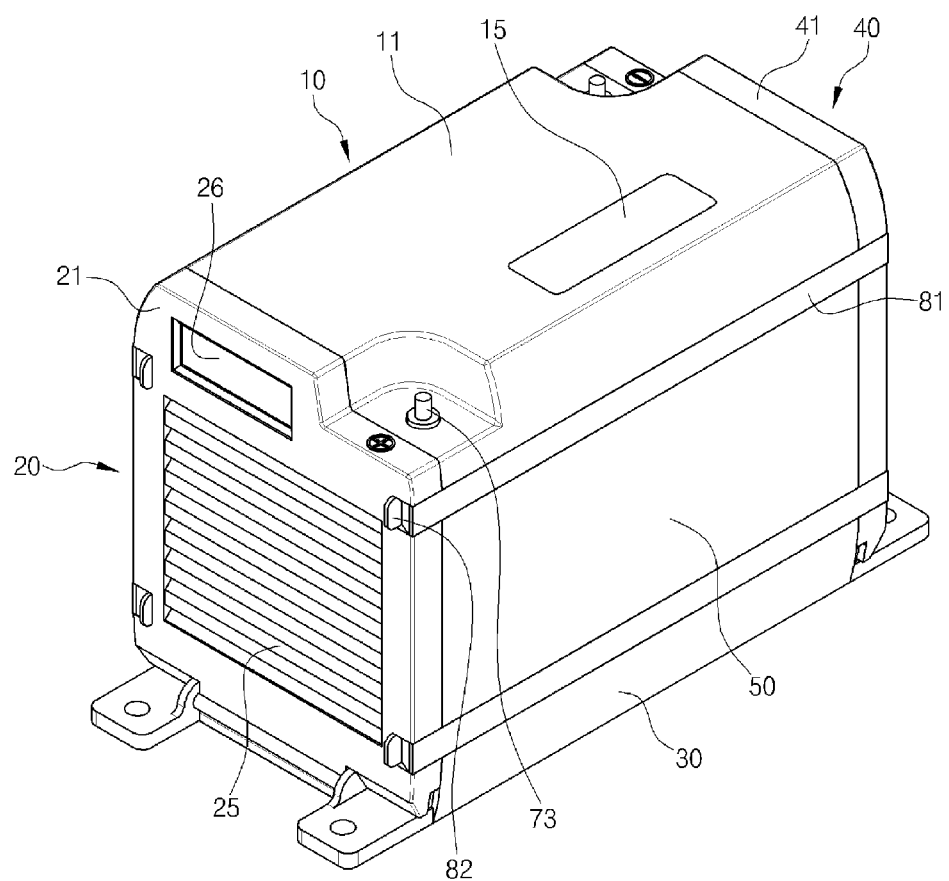
FIG. 1 is a perspective view illustrating a battery pack case, according to an embodiment of the present invention.
Figure 2:
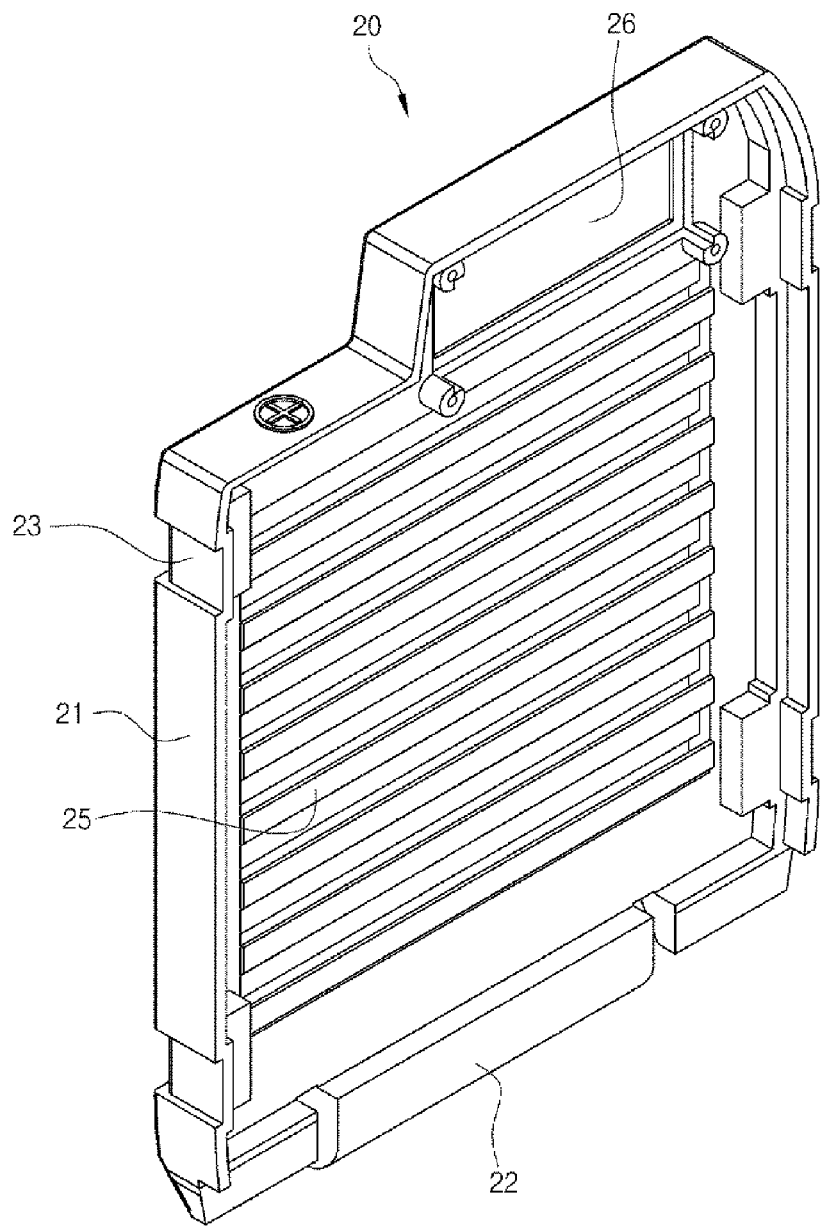
FIG. 2 is a perspective view showing a front cover of the battery pack case according to an embodiment of the present invention.

FIG. 1 is a perspective view illustrating the battery pack case according to the embodiment of the present invention. FIG. 2 is a perspective view illustrating a front cover of the battery pack case according to an embodiment of the present invention.

Referring to FIGS. 1 and 2, the battery pack case according to an embodiment of the present invention defines therein a space which contains a battery module 71 including one or more battery cells that are electrically connected to each other. The battery pack case includes a front cover 20, a rear cover 40, an upper cover 10, a pair of side covers 50 which form the opposite side surfaces of the battery pack case, a lower support base 30 which is disposed at a lower position and supports the side covers 50 so that the side covers 50 are placed upright, and fixing bands 80 which fix the front cover 20, the side covers 50, the lower support base 30 and the rear cover 40 together.

The upper cover 10 includes an upper cover body 11, a first upper insert part 13, a second upper insert part 14, a transparent window 15 and a pair of electrode pole holes 12. The upper cover body 11 is coupled to the side covers 50, the front cover 20 and the rear cover 40 in an insert coupling manner and forms the upper surface of the battery pack case. The first upper insert part 13 is coupled to the side covers 50. The second upper insert part 14 is coupled to the front cover 20 and the rear cover 40. The transparent window 15 is made of transparent material to allow a user to observe the internal space. Electrode poles 73 protrude outwards from the upper cover 10 through the electrode pole holes 12.

The upper cover body 11 that may be formed using, for example, plastic is coupled to the upper ends of the side covers 50 and fixed at the front and rear ends thereof to the front cover 20 and the rear cover 30.

The second upper insert part 14 includes a horizontal surface that is stepped from the front and rear ends of the top surface of the upper cover body 11 and protrudes forwards and rearwards from the front and rear ends of the upper cover body 11. The second upper insert part 14 protrudes forwards and rearwards at positions lower than the upper surface of the upper cover body 11 and is inserted into the front cover 20 and the rear cover 40.

The first upper insert part 13 includes a first coupling end 131 and a second coupling end 132 which are provided in a stepped form on each of ends of side surfaces that are bent downwards from the opposite side edges of the upper cover body 11.

The first coupling end 131 extends downwards from each of the ends of the side surfaces that are bent downwards from the opposite side edges of the upper cover body 11. The opposite ends of the first coupling end 131 are connected to the second upper insert part 14.

The second coupling end 132 is provided in a stepped form on each of the opposite side edges of the upper cover body 11 and extends downwards therefrom. The second coupling end 132 is disposed between the first coupling end 131 and the corresponding side edge of the upper cover body 11 and is stepped both from the first coupling end 131 and from upper cover body 11.

The transparent window 15 is a window that is made of transparent material such as glass or transparent plastic and is provided in an opening which is formed in the top surface of the upper cover body 11, thus allowing the user to observe the interior of the battery pack case.

The electrode pole holes 12 are formed in the upper cover body 11 so that the electrode poles 73, which are mounted on a circuit board 72 which will be explained later, protrude outwards from the upper cover body 11 through the respective electrode pole holes 12.

The front cover 20 will be explained in detail with reference to FIGS. 2 and 3.

FIG. 2 is a perspective view showing the front cover 20 of the battery pack case according to an embodiment of the present invention. FIG. 3 is a side view of the front cover 20 of the battery pack case.

Figure 3:
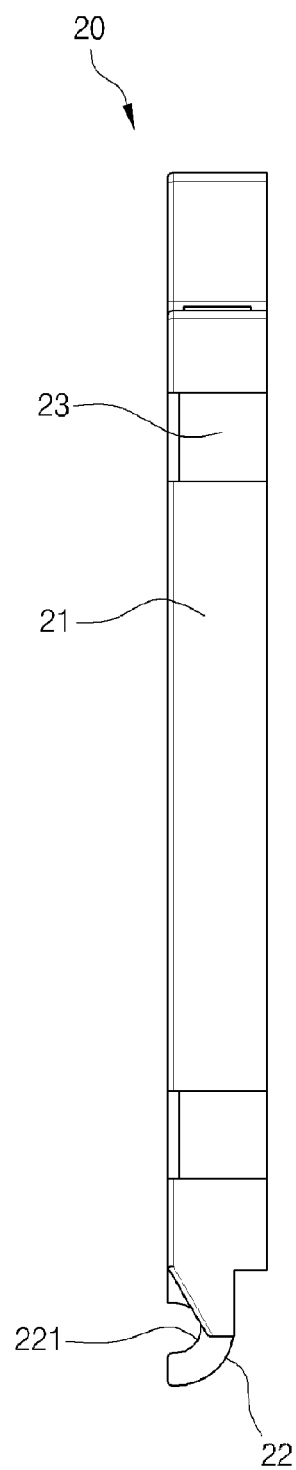
FIG. 3 is a side view of the front cover of the battery pack case according to an embodiment of the present invention.

Referring to FIGS. 2 and 3, the front cover 20 is placed upright on the front surface of the battery pack case and coupled to the side covers 50 and the lower support base 30 in an insert coupling manner. The front cover 20 includes a front cover body 21, a first heat dissipation window 25, a display 26, a first coupling extension 22, front seating depressions 23 and first band locking depressions 24. The front cover body 21 has a frame that extends horizontally on the upper and lower edges of the front cover body 21 and extends vertically on left and right side edges of the front cover body 21. The first heat dissipation window 25 is formed in the front cover body 21 to allow ventilation. The display 26 indicates the internal temperature and voltage/current that is being input or output. The first coupling extension 22 is coupled to the lower support base 30. The front seating depressions 23 are formed in opposite sides of the frame of the front cover body 21 so that the fixing bands 80 are coupled into the corresponding front seating depressions 23. The ends of the fixing bands 80 are locked to the corresponding band locking depressions 24.

In detail, the front cover body 21 is a plate that is placed upright, and the frame of the front cover body 21 includes horizontal parts and vertical parts that extend rearwards from upper, lower, left and right ends of the plate. A stepped portion 211 is formed in each of the upper inner surface and opposite side inner surfaces of the frame so that the front ends of the upper cover 10 and the side covers 50 are seated onto the corresponding stepped portions 211.

The first heat dissipation window 25 is formed in the front cover body 21, and a plurality of horizontal support bars are provided in the first dissipation window 25 at positions spaced apart from each other. The first heat dissipation window 25 functions to discharge internal heat out of the battery pack case. The support bars (not designated by a reference numeral) are horizontally oriented and fixed in the first heat dissipation window 25, wherein the support bars are inclined downwards with respect to the forward direction, thus preventing dust or impurities from entering the battery pack case while internal air can be smoothly discharged outside.

The display 26 is fixed on the front cover body 21 and is connected to a voltage sensor (not shown) and a temperature sensor (not shown) which are mounted on the circuit board 72 which will be explained later. The display 26 outputs an input/output voltage level and the internal temperature, which are sensed by the voltage sensor and the temperature sensor, as numerical values, thus allowing the user to visually check them.

The first coupling extension 22 protrudes downwards from the lower end of the front cover body 21 and has a semicircular cross-section. A first shaft locking depression 221 that extends in the horizontal direction is formed in a surface of the first coupling extension 22.

The first shaft locking depression 221 is a depression which is formed in the surface of the first coupling extension 22 that extends in the horizontal direction. The first shaft locking depression 221 is open towards the front surface of the front cover body 21.

The front seating depressions 23 are depressions which are formed in the opposite side surfaces of the frame of the front cover body 21 to form stepped portions. Each front seating depression 23 is open on the front and rear ends thereof so that it is connected to a corresponding rear seating depression 43 which will be explained in detail later herein. According to an embodiment, at least one front seating depression 23 is formed in each side surface of the frame of the front cover body 21.

Each first band locking depression 24 is a depression into which an end of the corresponding fixing band 80 is inserted and locked. The shape of the first band locking depression 24 corresponds to that of the end of the fixing band 80.

The lower support base 30 and the side covers 50 according to an embodiment of the present invention will be described in detail with reference to FIGS. 4 and 5.

Figure 4:
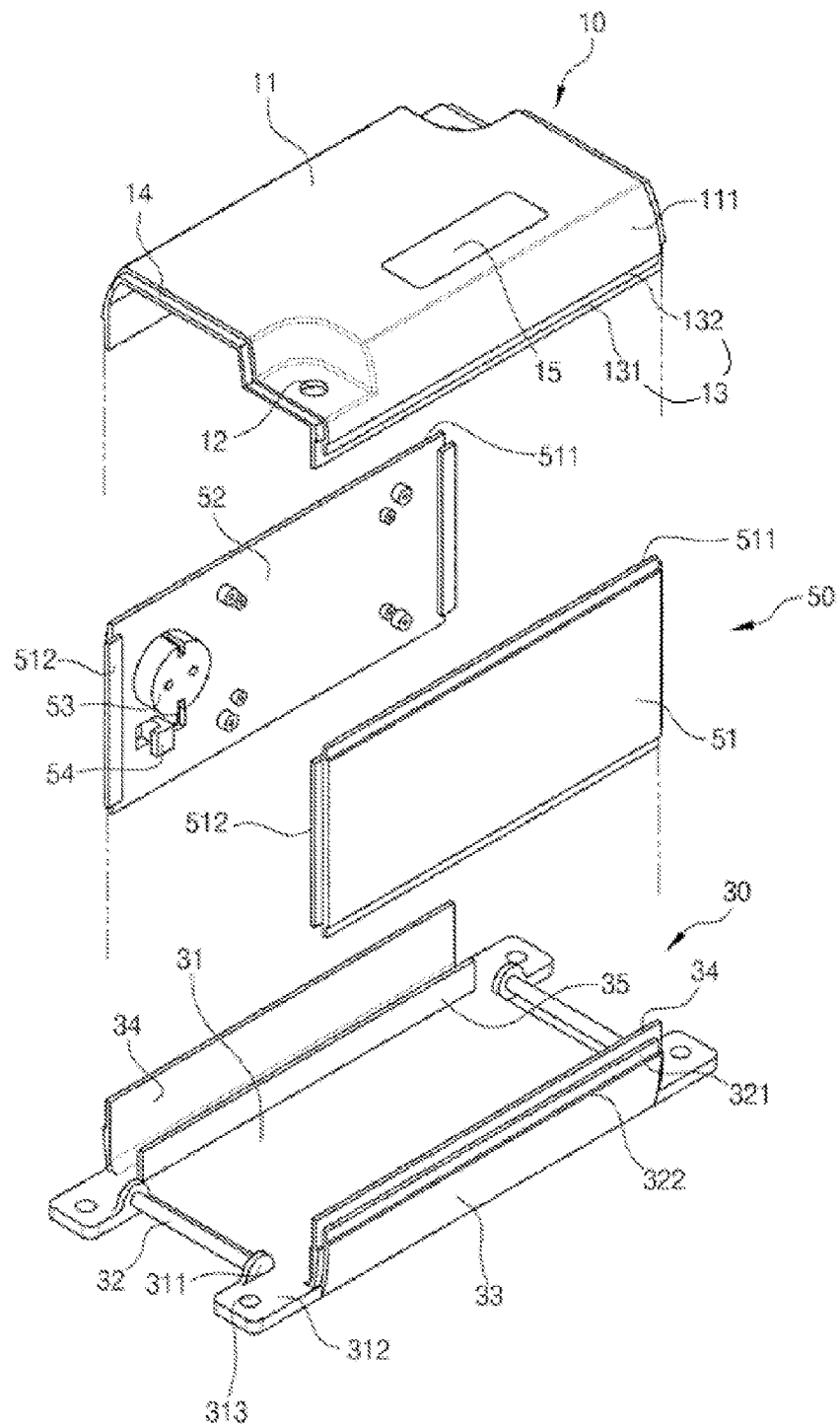
FIG. 4 is an exploded perspective view showing the coupling structure of side covers of the battery pack case according to an embodiment of the present invention.

FIG. 4 is an exploded perspective view illustrating the coupling structure of the side covers 50 of the battery pack case according to the embodiment of the present invention. FIG. 5 is a side view illustrating the coupling structure of the side covers 50 of the battery pack case according to the embodiment of the present invention.

Figure 5:
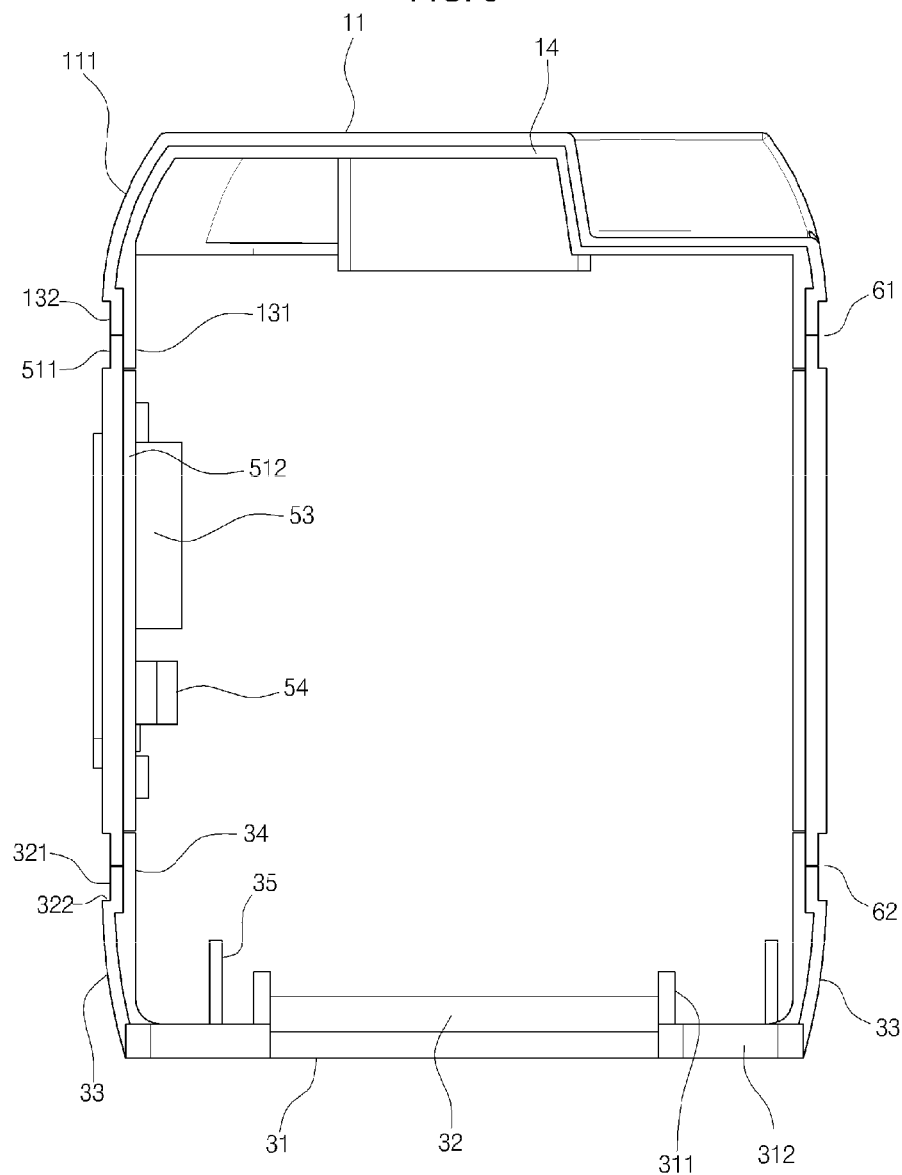
FIG. 5 is a side view showing the coupling structure of side covers of the battery pack case according to an embodiment of the present invention.

Referring to FIGS. 4 and 5, the side covers 50 include side cover bodies 51 and 52 which are placed upright, a USB terminal 54 which is connected to the circuit board 72 on the inner surface of the side cover body 51 or 52, and a power connector 53 through which power is output.

The side cover bodies 51 and 52 include plates that are placed upright at positions spaced apart from each other by a predetermined distance and form opposite sidewalls of the battery pack case. The side cover bodies 51 and 52 are coupled to the front cover 20, the rear cover 40, the upper cover 10 and the lower support base 30.

Each side cover body 51, 52 includes side insert ends 511 which protrude from the upper and lower ends of the side cover body 51, 52 in a stepped shape so that the side cover body 51, 52 is coupled to the upper cover 10 and the lower support base 30 by the side insert ends 511, and mounting bars 512 which are respectively coupled to the front cover 20 and the rear cover 40.

In detail, the side insert ends 511 protrude from the upper and lower ends of each side cover body 51, 52 and are stepped from the outer surface of the side cover body 51, 52. The side insert ends 511 are seated onto the corresponding stepped portions of the first upper insert part 13 and are put into close contact with the lower ends of the second coupling ends 132.

Here, when each side insert end 511 is connected to the corresponding second coupling end 132, a seating depression 61 and 62 into which the fixing band 80 is seated is formed between the stepped portion of the side insert end 511 and the stepped portion of the second coupling end 132.

The mounting bars 512 are provided on the inner surface of each side cover body 51, 52 and extend in the vertical direction. The mounting bars 512 are inserted into the front cover 20 and the rear cover 40.

The power connector 53 is fixed on the inner surface of either side cover body 51 or 52 so that a power plug can be inserted into the power connector 53 from the outside. The power connector 53 is connected to the battery cells to supply power to the inserted power plug.

The USB terminal 54 is a connection device for communication which is connected to an external BMS (Battery Management System). The USB terminal 54 is connected to a controller (not shown) which controls elements of the circuit board 72, the display 26, etc.

The lower support base 30 includes a bottom plate 31, bottom side plates 33 which are bent upwards from opposite side edges of the bottom plate 31, and coupling plates 34 which protrude upwards from the inner surfaces of the respective bottom side plate 33 such that the upper ends of the coupling plates 34 are stepped from the upper ends of the bottom side plate 33. The lower support base 30 further includes a hinge shaft 32 to which the coupling extension 22 of the front cover 20 is coupled, and a support plate 35 which supports battery cells 711, 712 and 713 that are contained in the battery pack case.

The bottom plate 31 forms the bottom of the battery pack case. Support panels 312 protrude from opposite sides of front and rear ends of the bottom plate 31, and a fastening hole 313 is formed in each support panel 312. Shaft support plates 311 protrude upwards from side edges of the support panels 312 that face each other so that the opposite ends of the hinge shaft 32 are fixed to the shaft support plates 311. The front and rear ends of the bottom plate 31 are open, while the bottom side plates 33 protrude upwards from the opposite side edges of the bottom plate 31.

The hinge shaft 32 is provided on each of the front and rear ends of the bottom plate 31. The front cover 20 and the rear cover 40 are coupled to the respective hinge shafts 32. In detail, each hinge shaft 32 is fixed at the opposite ends thereof to the corresponding shaft support plates 311. Referring to the case of the front cover 20, the hinge shaft 32 is seated into the first shaft locking depression 221 of the coupling extension 22 of the front cover 20. To couple the front cover 20 to the lower support base 30, the hinge shaft 32 is seated into the coupling extension 22 of the front cover 20 that has been placed in the horizontal direction. Subsequently, the front cover 20 is rotated upwards around the hinge shaft 32 and coupled to the lower support base 30. The rear cover 40 is symmetrical with the front cover 20. The rear cover 40 therefore is coupled to the lower support base 30 using the same structure as that of the coupling extension of the front cover 20 which works in the same manner as does the front cover 20.

The bottom side plates 33 protrude upwards from the opposite side edges of the bottom plate 31 and are connected to the lower ends of the respective side covers 50. To achieve the above purpose, each bottom side plate 33 may include a first lower insert end 321 which has an upper stepped end that is brought into close contact with the side insert end 511 that protrudes downwards from the lower end of the side cover 50. The bottom side plate 33 includes a second lower insert end 322 which is provided under the first lower insert end 321 to form the stepped portion.

The first lower insert end 321 is the uppermost end of the bottom side plate 33 and is put into close contact with the lower end of the corresponding side insert end 511.

The second lower insert end 322 is a plane that is provided under the first lower insert end 321 such that the second lower insert end 322 along with the first lower insert end 321 forms the stepped portion. When the first lower insert end 321 is connected to the side insert end 511, the second lower insert end 322 is vertically spaced apart from the stepped portion of the outer surface of the corresponding side cover body 51, 52, thus forming a seating depression 61 and 62 into which the corresponding fixing band 80 is seated.

The coupling plate 34 protrudes upwards from the inner surface of the bottom side plate 33, and the end of the coupling plate 34 is seated onto a stepped portion that is formed between the lower ends of the mounting bars 512 and the side insert end 511 of the corresponding side cover body 51, 52. Further, the coupling plate 34 extends forwards from the bottom side plate 33, and this extended portion is stepped from the outer surface of the bottom side plate 33 and is inserted into the front cover 20.

The structure of the rear cover 40 is symmetrical with that of the front cover 20. The rear cover 40 is connected to the side covers 50, the upper cover 10 and the lower support base 30 in an insert coupling manner and forms the rear surface of the battery pack case.

To achieve the above purpose, the rear cover 40 may include a rear cover body 41, a second heat dissipation window 45, a second coupling extension 42, rear seating depressions 43 and second band locking depressions. Although the second band locking depressions are not shown in the drawings, they are respectively disposed at positions corresponding to the first band locking depressions 24 of the front cover 20. The rear cover body 41 has a frame that extends horizontally on the upper and lower edges of the rear cover body 41 and extends vertically on left and right side edges of the rear cover body 41. The second heat dissipation window 45 is formed in the rear cover body 41. The second coupling extension 42 is coupled to the lower support base 30. The rear seating depressions 43 are formed in opposite sides of the frame of the rear cover body 41 so that the fixing bands 80 are coupled into the corresponding front seating depressions 23. The ends of the fixing bands 80 are locked to the corresponding second band locking depressions.

In detail, the rear cover body 41 is a plate that is placed upright, and the frame of the rear cover body 41 includes horizontal parts and vertical parts that extend rearwards from upper, lower, left and right ends of the plate. A stepped portion 411 is formed in each of the upper inner surface and opposite side inner surfaces of the frame so that the rear ends of the upper cover 10 and the side covers 50 are seated onto the corresponding stepped portions 411.

The second heat dissipation window 45 is formed in the rear cover body 41 in such a way that a plurality of horizontal support bars are provided therein at positions spaced apart from each other. The second heat dissipation window 45 functions to discharge internal heat out of the battery pack case. The support bars are horizontally oriented and fixed in the second heat dissipation window 45, wherein they are inclined downwards with respect to the rearward direction, thus preventing dust or impurities from entering the battery pack case while internal air can be smoothly discharged outside.

The second coupling extension 42 extends from the lower end of the rear cover body 41 and is curved to form a second shaft locking depression that extends in the horizontal direction in the same manner as the first shaft locking depression 221 is formed.

The second shaft locking depression is coupled to the corresponding hinge shaft 32 of the lower support base 30 so that the rear cover 40 is coupled both to the upper cover 10 and to the side covers 50 and is rotatably supported around the hinge shaft 32.

The rear seating depressions 43 are depressions which are formed in the opposite side surfaces of the frame of the rear cover body 41 to form stepped portions. Each rear seating depression 43 extends to the corresponding second band locking depression.

Each second band locking depression is a depression into which an end of the corresponding fixing band 80 is inserted and locked. The shape of the second band locking depression corresponds to that of the end of the fixing band 80.

Figure 6:
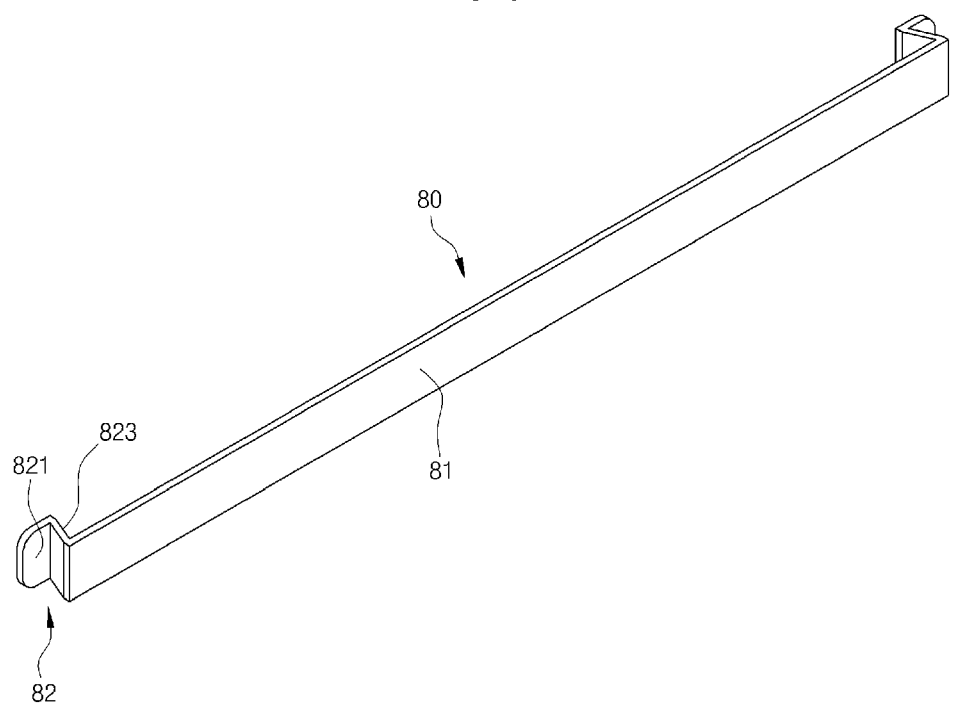
FIG. 6 is a perspective view showing a fixing band of the battery pack case according to an embodiment of the present invention.

The fixing bands 80 will be explained in detail with reference to FIG. 6. The fixing bands 80 are seated into the respective seating depressions 61 and 62 which are formed in the opposite sidewalls of the battery pack case and extend to the front and rear covers 20. The opposite ends of each fixing band 80 are locked to the corresponding first band locking depression 24 of the front cover 20 and the corresponding second band locking depression of the rear cover 40, thus fastening the front and rear covers 20 and 40.

In detail, the fixing band 80 includes a band body 81 which extends a predetermined length, and locking protrusions 82 which are bent from the opposite ends of the band body 81 and are respectively seated into the corresponding first and second band locking depressions.

The band body 81 includes a plate which extends a predetermined length in the front-rear direction and is seated into each of the seating depressions 61 and 62 that are formed when the side covers 50 are coupled to the lower support base 30 and the upper cover 10. According to an embodiment, the material of the band body 81 may be rubber, synthetic resin or fabric that has elasticity.

The locking protrusion 82 is formed on each of the opposite ends of the band body 81 into an 'L' shape. In detail, the locking protrusion 82 includes a first bent surface 823 which is bent from each end of the band body 81 towards the interior of the battery pack case, and a second bent surface 821 which is bent from the first bent surface 823 towards the front or rear of the battery pack case.

The operation of the present invention having the above-mentioned construction will be explained in detail with reference to FIGS. 7 and 8.

Figure 7:
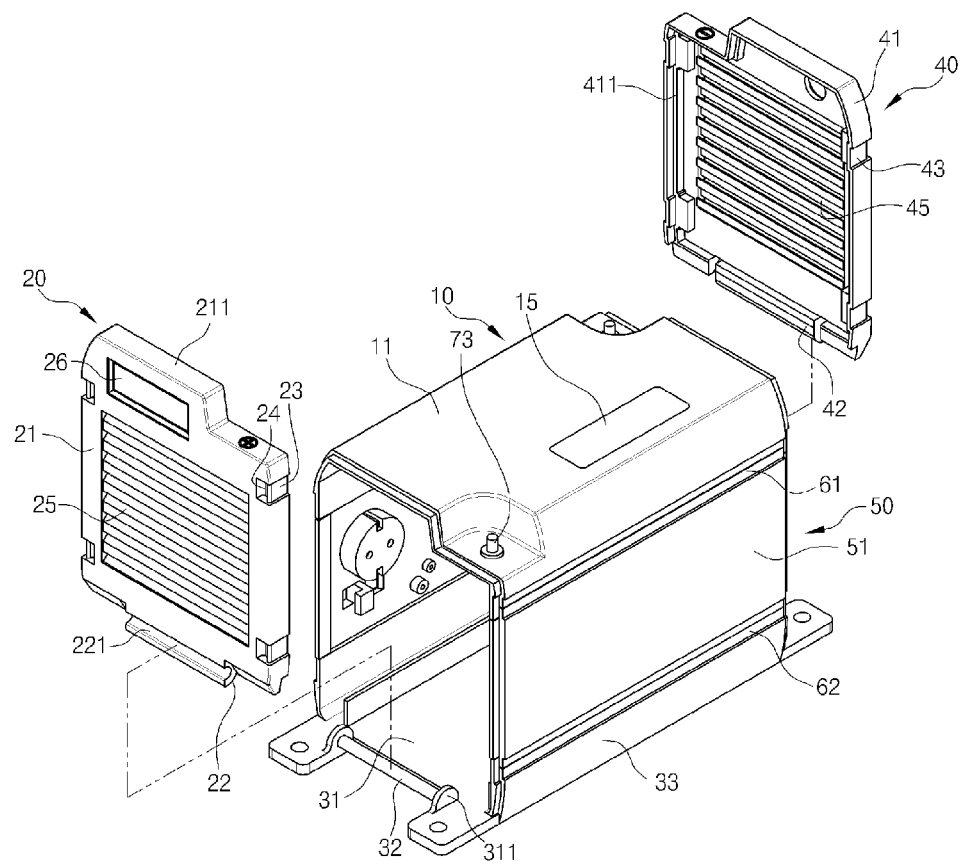
FIG. 7 is an exploded perspective view showing the coupling structure of the front and rear covers of the battery pack case according to an embodiment of the present invention.

FIG. 7 is an exploded perspective view showing the coupling structure of the front and rear covers 20 and 40 of the battery pack case according to an embodiment of the present invention. FIG. 8 is a perspective view showing an example in which a battery module 71 is mounted in the battery pack case according to an embodiment of the present invention.

Figure 8:
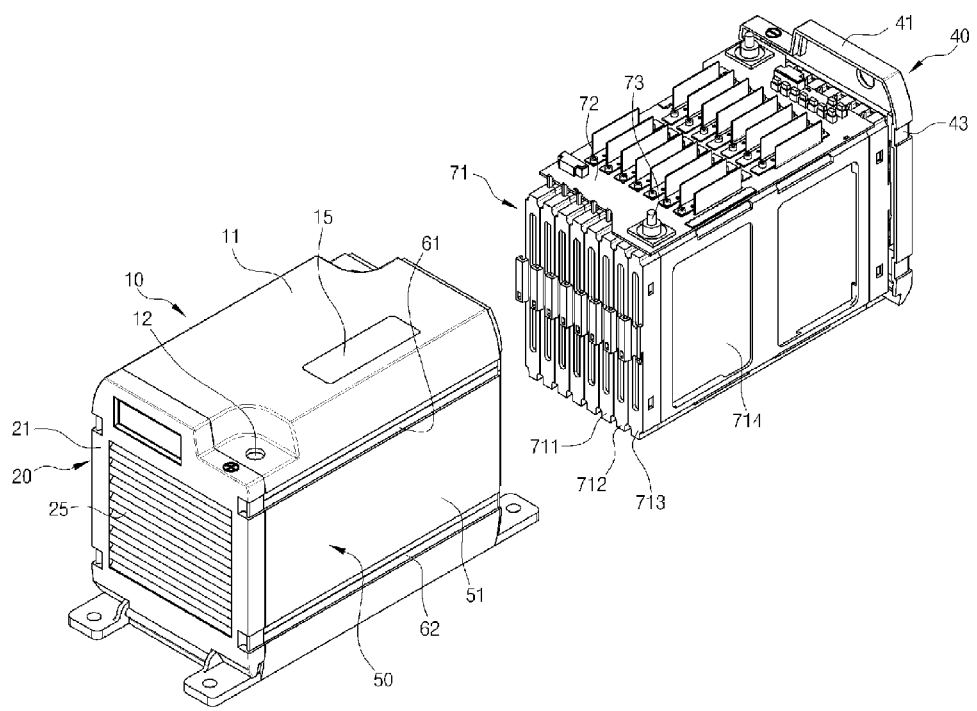
FIG. 8 is a perspective view showing an example in which a battery module is mounted in the battery pack case according to an embodiment of the present invention.

Referring to FIGS. 7 and 8, the battery pack case of an embodiment of the present invention is assembled as follows. First, a worker places the side covers 50 on the upper ends of the respective bottom side plates 33 of the lower support base 30.

Thereby, the side insert end 511 that protrudes downwards from each side cover 50 comes into close contact with the end of the first lower insert end 321 of the corresponding bottom side plate 33 of the lower support base 30, so that the seating depression 61 and 62 into which the fixing band 80 is seated is defined between the outer surface of the side cover body 51, 52 of each side cover 50 and the corresponding second lower insert end 322.

The upper end of each coupling plate 34 comes into contact with the lower end of the corresponding mounting bars 512. Therefore, the coupling plates 34 of the lower support base 30 are coupled to the side covers 50 inside the first side insert ends 511.

After the side covers 50 have been coupled to the lower support base 30, the worker places the upper cover 10 on the upper ends of the side covers 50. In detail, the first coupling ends 131 of the upper cover 10 are placed on the upper ends of the mounting bars 512. The second coupling ends 132 are placed on the side insert ends 511 that are the upper ends of the side cover bodies 51 and 52. Because the height at which the first coupling end 131 and the mounting bar 512 make contact with each other differs from the height at which the second coupling end 132 and the upper end of the side insert end 511 make contact with each other, the upper cover 10 can be supported on the side covers 50.

After the upper cover 10, the side covers 50 and the lower support base 30 have been assembled with each other, the front cover 20 is assembled with the lower support base 30.

To couple the front cover 20 to the lower support base 30, the worker places the front cover 20 in the horizontal direction and inserts the hinge shaft 32 into the first shaft locking depression 211. The worker thereafter rotates the front cover 20 upwards until the front ends of the first upper insert part 13 of the upper cover 10, the front ends of the mounting bars 512 of the side covers 50 and the front ends of the coupling plates 34 are inserted into the stepped portions 211 of the front cover 20.

In the same manner as the coupling of the front cover 20, the worker places the rear cover 40 in the horizontal direction, inserts the hinge shaft 32 into the second shaft locking depression, and rotates the rear cover 40 upwards, thus coupling the rear cover 40 to the upper cover 20, the side covers 50 and the lower support base 30. Here, the rear end of the first upper insert part 13 that protrudes rearwards from the upper cover 10, the rear ends of the mounting bars 512 that protrude rearwards from the side covers 50, and the rear ends of the coupling plates 34 that protrude rearwards from the lower support base 30 are inserted into the stepped portions formed in the inner surface of the frame of the rear cover 40.

When the side covers 50, the upper cover 10 and the lower support base 30 are assembled with each other, the seating depressions 61 and 62 are formed between the stepped portions of the upper cover 10 and the side covers 50 and between the stepped portions of the lower support base 30 and the side covers 50.

When the front cover 20 and the rear cover 40 are coupled to the upper cover 10, the side covers 50 and the lower support base 30, the seating depressions 61 and 62 extend to the front seating depressions 23 and the rear seating depressions 43.

Subsequently, the band bodies 81 of the fixing bands 80 are inserted into the corresponding seating depressions 61 and 62. The locking protrusions 82 that are formed on the opposite ends of each fixing band 80 are respectively inserted into the corresponding first band locking depression 24 of the front cover 20 and the corresponding second band locking depression of the rear cover 40, thus fastening the front cover 20, the upper cover 10, the side covers 50 and the lower support base 30 of the battery pack case together.

As such, in the embodiment of the present invention, the elements of the battery pack case can be assembled with each other using the symmetrical depressed structure without using a separate fastening means, such as screws, bolts, etc., which require the use of a screwdriver or wrench. The assembled battery pack case is fastened with the fixing bands 80. Therefore, the present invention can reduce the number of assembly processes and working time.

The display 26 that is provided on the front cover 20 can indicate a voltage level that is being input or output, the residual amount of the battery, and the interior temperature of the battery pack case. Furthermore, the level of power that can be output can be diversified by the power connector 53 and the USB terminal 54 as well as the electrode poles 73 that protrude upwards from the top surface of the upper cover 10.

To achieve the above purpose, an embodiment of the present invention is provided with the circuit board 72. In detail, one or more battery cells are connected to each other in series and/or parallel, thus forming the battery module 71. The battery module 71 is contained in the battery pack case. The circuit board 72 is connected to the battery module 71 and functions to diversify the voltage which is output from the battery module 71 as stated above. Further, the voltage sensor and the temperature sensor which can sense the internal temperature, the output level of the power and the remaining power level are mounted on the circuit board 72.

For example, the circuit board 72 includes a sensing board (not shown) which is mounted with the voltage sensor which is connected to a battery tab of the battery cells to measure the voltage of the battery cells and the temperature sensor which senses the internal temperature of the battery pack case.

The battery pack case of the present invention is connected to an external system or an external BMS (Battery Management System) by the power connector 53 or the USB terminal 54 so that the internal battery cells can be charged or output. Therefore, the battery pack case of the present invention can also be used for domestic or portable use rather than for industrial use.

In other words, the present invention can not only output voltage from the electrode poles 73 that protrude from the top surface of the upper cover 10 but can also have the function of an ESS (Energy Storage System) in which external power is charged into the battery cells by the power connector 53 provided in the side cover 50. Moreover, the present invention can use the USB terminal 54 for communication with an external system or external battery, thus diversifying the output voltage to different levels.

As described above, in a battery pack case according to embodiments of the present invention, elements of the battery pack case have symmetrical depressed structures so that they can be easily assembled with each other without using a separate fastening means, such as screws, bolts, etc., thus reducing the number of assembly processes and working time, thereby increasing the working efficiency, and reducing the production cost.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery pack case, comprising:
    a lower support base forming a bottom of an internal space to contain a battery module including battery cells electrically connected to each other;
    side covers coupled to respective opposite side edges of the lower support base, each of the side covers comprising a plate placed upright;
    an upper cover coupled to upper ends of the side covers to form an upper surface of the battery pack case;
    a front cover and a rear cover respectively coupled to front and rear ends of the upper cover and the side covers; and
    a fixing band fastened to opposite sidewalls of the battery pack case to couple the front cover, the side covers, the lower support base and the rear cover together,
    wherein the upper cover, the lower support base and each of the side covers have at least one seating depression extending in a sideways direction,
    each of the front and rear covers has at least one band locking depression at a position corresponding to said at least one seating depression, said at least one band locking depression having a shape corresponding to a related one of ends of the fixing band, and
    the fixing band comprises a band body extending in one direction, and a locking protrusion provided on each of opposite ends of the band body, the locking protrusion having a structure corresponding to a related one of the band locking depression, so that the locking protrusion of the fixing band is inserted into the corresponding band locking depression, thus fastening the front cover, the upper cover, the side covers, the lower support base and the rear cover to each other.

2. The battery pack case as set forth in claim 1, wherein the upper cover comprises:
    a first upper insert part stepped from side surfaces extending downwards from opposite side edges of the top surface, the first upper insert part extending downwards towards the upper ends of the side covers; and
    a second upper insert part extending from a top surface of the upper cover forwards the front cover and the rear cover, the second upper insert part being inserted into the front cover and the rear cover.

3. The battery pack case as set forth in claim 1, wherein each of the side covers comprises:
    a side cover body;
    a first side insert end stepped and protruded from each of upper and lower ends of the side cover body; and
    mounting bars provided on the side cover body and extending in a vertical direction, the mounting bars respectively protruding from the side cover body towards the front cover and the rear cover.

4. The battery pack case as set forth in claim 1, wherein the lower support base comprises:
    a bottom plate;
    hinge shafts provided on front and rear ends of the bottom plate, each of the hinge shafts being fastened at opposite ends thereof to shaft support plates that are placed upright on the bottom plate at positions spaced apart from each other;
    bottom side plates protruding upwards from opposite side edges of the bottom plate, the bottom side plates being coupled to the corresponding side covers; and
    coupling plates protruding upwards from the bottom plate to have different heights relative to upper ends of the bottom side plates, the coupling plates making close contact with inner surfaces of the corresponding side covers.

5. The battery pack case as set forth in claim 4, wherein the lower support base further comprises
    at least one support panel extending from the bottom plate, with a fastening hole formed through the support panel, the support panel being in close contact with a support surface.

6. The battery pack case as set forth in claim 4, wherein each of the front and rear covers comprises a coupling extension extending downwards therefrom and having a semicircular cross-section, a shaft locking depression is formed in the coupling extension that extends in a horizontal direction, and the corresponding hinge shaft is seated into the shaft locking depression.

7. The battery pack case as set forth in claim 1, wherein the front cover comprises:
    a display indicating at least one of an internal temperature and an input/output voltage level; and
    a heat dissipation window having an opening and a plurality of horizontal support bars provided in the opening, each of the support bars capable of being inclined, so that heat generated in the battery pack case is dissipated to an outside through the heat dissipation window.

8. The battery pack case as set forth in claim 1, wherein the side covers further comprise:
    a power connector through which external power is input/output; and
    a USB terminal for communication with an external battery or an external system.

9. The battery pack case as set forth in claim 1, wherein the upper cover further comprises:
    an electrode pole hole through which an electrode pole protrudes from the top surface of the upper cover, so that power is input into or output from the battery module including the battery cells electrically connected to each other; and
    a transparent window formed in the top surface of the upper cover to allow a user to observe an interior of the battery pack case.

10. The battery pack case as set forth in claim 1, wherein the seating depression is formed between a stepped portion of each of the side covers and a stepped portion of the upper cover.

11. The battery pack case as set forth in claim 1, wherein the seating depression is formed between a stepped portion of each of the side covers and a stepped portion of a corresponding one of the bottom side plates that protrude upwards from the lower support base.

12. The battery pack case as set forth in claim 5, wherein the lower support base further comprises support plates provided upright on the bottom plate at positions spaced apart from each other, the support plates supporting opposite sides of the battery cells placed on the bottom plate.

13. The battery pack case as set forth in claim 1, wherein the locking protrusion provided on the opposite ends of the band body has an 'L' shape.

14. The battery pack case as set forth in claim 1, wherein the band body is made of rubber, fabric or plastic.

15. A battery pack case, comprising:
a Lower support base forming a bottom of an internal space to contain a battery module including battery cells electrically connected to each other;
side covers coupled to the lower support base to cover sides facing to each other;
an upper cover coupled to the upper cover and the side covers to form a front side of the battery pack case;
a rear cover coupled to the upper cover and the side covers to form a rear side of the battery pack case;
at least one seating depression extending in a sideways direction, said at least one seating depression formed in the upper cover, the lower support base and the side covers, and
at least one fixing band seating on said at least one seating depression to couple the front cover, the side covers, the lower support base and the rear cover together, wherein each of the front and rear covers has at least one band locking depression at a position corresponding to said at least one seating depression, said at least one band locking depression having a shape corresponding to a related one of ends of the fixing band.

16. The battery pack case as set forth in claim 15, wherein the fixing band comprises a band body extending in one direction, and a locking protrusion provided on each of opposite ends of the band body, the locking protrusion having a structure corresponding to a related one of the band locking depression, so that the locking protrusion of the fixing band is inserted into the corresponding band locking depression, thus fastening the front cover, the upper cover, the side covers, the lower support base and the rear cover to each other.

* * * * *